(12) United States Patent
Minto

(10) Patent No.: US 6,193,010 B1
(45) Date of Patent: Feb. 27, 2001

(54) SYSTEM FOR GENERATING A SEISMIC SIGNAL IN A BOREHOLE

(75) Inventor: James Minto, Houston, TX (US)

(73) Assignee: Tomoseis Corporation, Houston, TX (US)

( * ) Notice: Subject to any disclaimer, the term of this patent is extended or adjusted under 35 U.S.C. 154(b) by 0 days.

(21) Appl. No.: 09/413,630

(22) Filed: Oct. 6, 1999

(51) Int. Cl.[7] ........................................................ G01V 1/40
(52) U.S. Cl. ............................ 181/102; 181/106; 367/911
(58) Field of Search ........................................ 181/102, 106, 181/113, 401, 402; 367/25, 86, 911

(56) References Cited

U.S. PATENT DOCUMENTS

| 4,671,379 | 6/1987 | Kennedy et al. . |
| 4,834,210 | 5/1989 | Kennedy . |
| 4,858,718 | * 8/1989 | Chelminski ........................... 181/106 |
| 5,137,109 | 8/1992 | Dorel . |
| 5,171,943 | 12/1992 | Balogh et al. . |

OTHER PUBLICATIONS

S. T. Chen; A Single–Well Profiling Tool and Tube Wave Suppression; Society of Exploration Geophysicists; Expanded Abstracts with Biographies; 63rd Annual Meeting and International Exhibition, Washington, D.C.; Sep. 26–30, 1993; p. 13–16.

W. Thomas Balogh; The Borehole Tubewave Damper Probe; Society of ExplorationGeophysicists: Expanded Abstracts with Bibliographies; 62nd Annual International SEG Metting; New Orleans; Oct. 25–29, 1992; p. 159–162.

* cited by examiner

Primary Examiner—Khanh Dang
(74) Attorney, Agent, or Firm—E. Eugene Thigpen

(57) ABSTRACT

The invention is an apparatus for generating a seismic signal in a fluid filled borehole which includes an elongated housing formed from a gas impermeable material and a controlled frequency energy source within said housing. The housing has an external shape which expands and contracts in response to variations in pressure within said housing to enhance the transmission of said seismic signal to the borehole fluid, such as pressure variations resulting from fluid resonance within said housing.

28 Claims, 13 Drawing Sheets

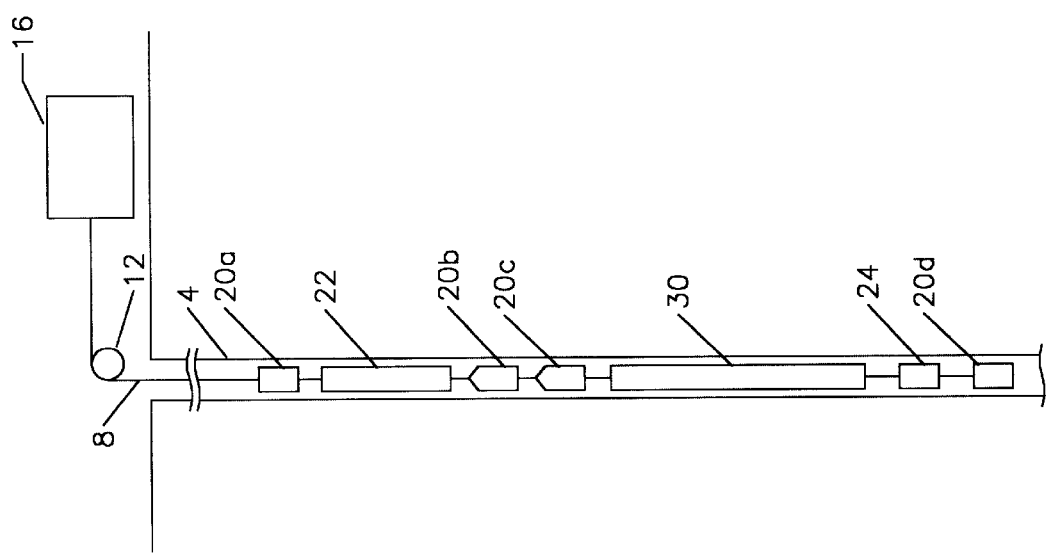

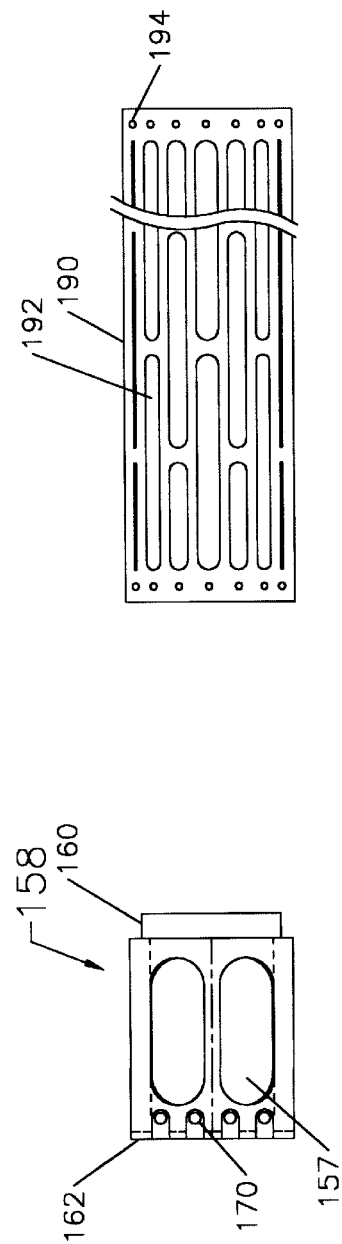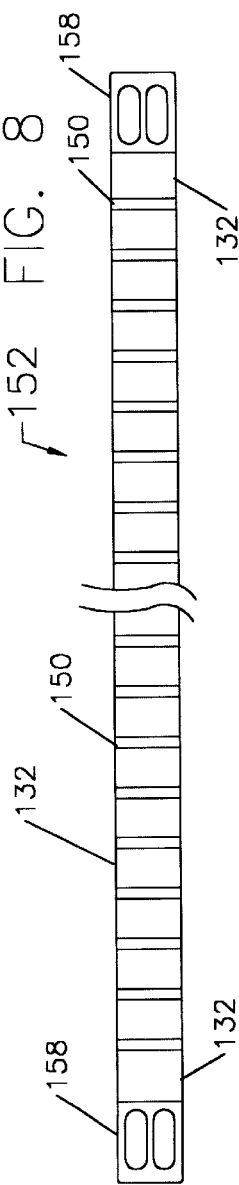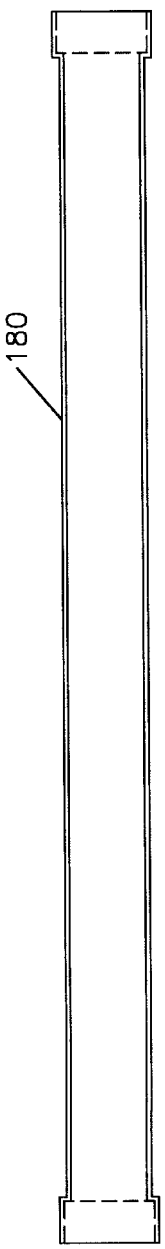

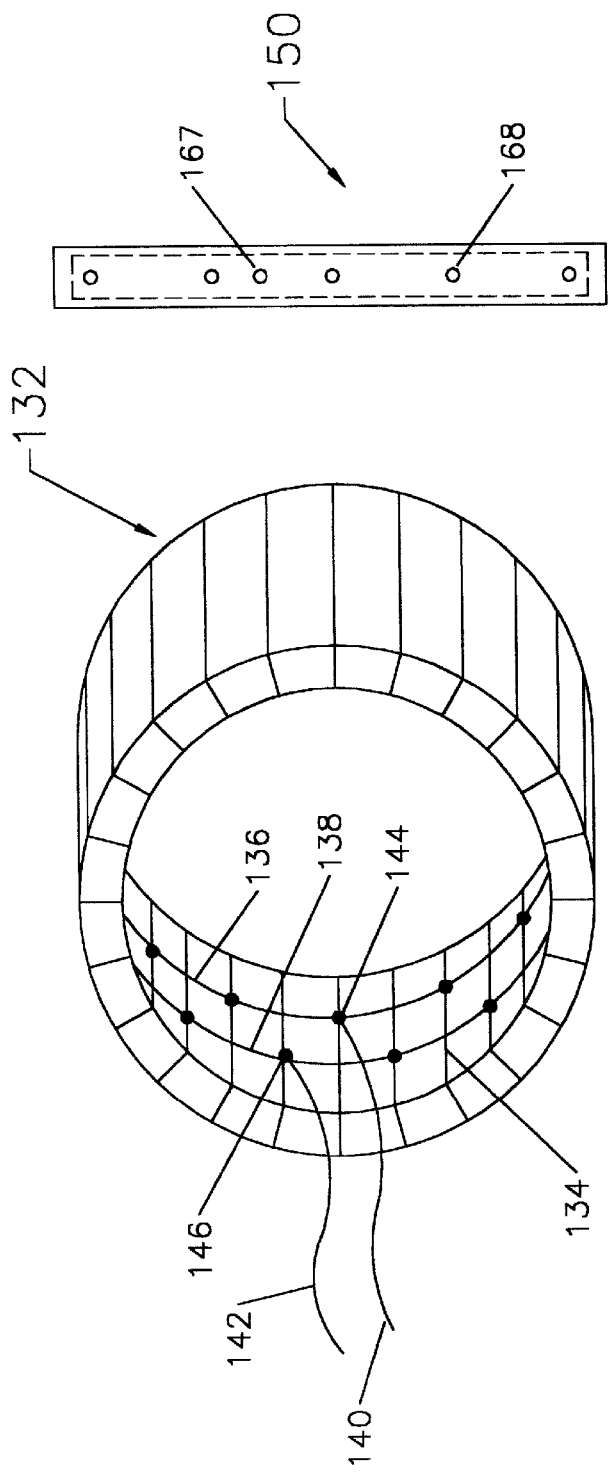
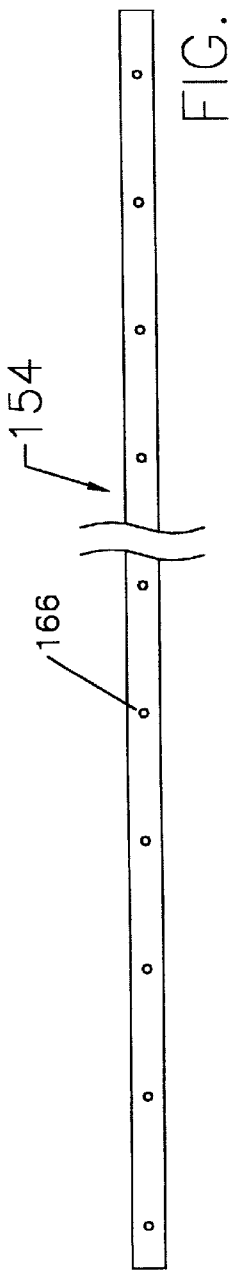

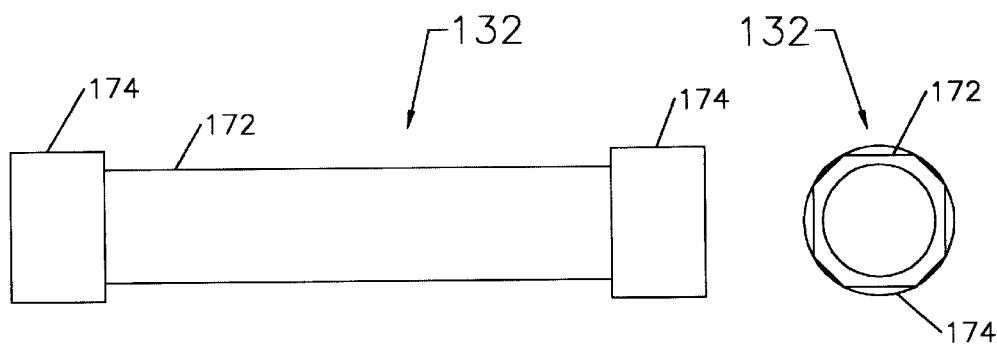
FIG. 13A
FIG. 13B
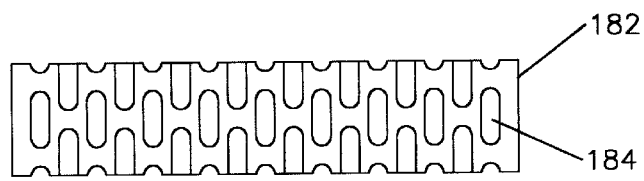
FIG. 13C
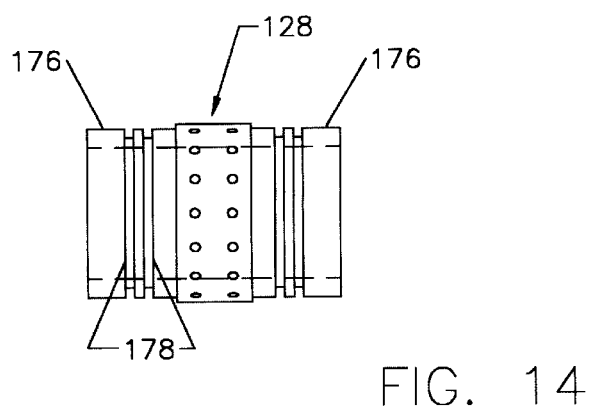
FIG. 14

SYSTEM FOR GENERATING A SEISMIC SIGNAL IN A BOREHOLE

RELATED PATENT APPLICATIONS

This patent application is related to U.S. patent application Ser. No. 09/413,631, filed on Oct. 6, 1999, Ser. No. 09/002,474, titled "Dual Mode Multiple-Element Resonant Cavity Piezoceramic Borehole Energy Source", having a filing date of Jan. 2, 1998; and a U.S. Patent Application titled "Apparatus and Method for Attenuating Tube Waves in a Borehole", having the same filing date as this present application.

BACKGROUND OF THE INVENTION

A number of different kinds of borehole seismic sources have been utilized for generating a seismic signal in a borehole, including impulsive sources, such as primacord and air guns. Swept frequency signal generators have also been employed including the source disclosed in U.S. Pat. No. 4,671,379, and sources using piezoceramic actuators, such as disclosed in U.S. patent application Ser. No. 09/002,474, having a filing date of Jan. 2, 1998.

Piezoelectric actuators typically comprise a plurality of cylindrical elements of a piezoceramic material which are aligned so that the elements operate in unison. These aligned piezoceramic elements are then enclosed in an elongated bladder or sleeve which is substantially filled with a fluid. Such an elongated sleeve or bladder isolates the piezoceramic elements, and the accompanying electrical conductors, from the borehole fluid. Enclosing the aligned piezoceramic elements in an elongated expandable bladder also assists the source in achieving a resonance mode, which enhances the output power generated by the source. Maximum power output is achieved at a resonance frequency, such as the half wave resonance frequency. The half wave resonance frequency, f, is defined by the equation:

$$f = c/2L$$

in which c is the acoustic velocity of the fluid which fills the bladder or sleeve, and L is the internal length of the bladder or sleeve.

In the prior art, the bladder has typically been formed from an elastomeric material, because elastomeric materials expand and contract readily. An expandable bladder or sleeve increases the magnitude of the generated signal at resonance. A severe problem has been encountered with the use of elastomeric bladders in downhole operations, however. Gases that are present in the borehole fluid will penetrate the bladder and collect in the interior of the bladder. When the piezoceramic source is brought back to the earth's surface, the gases inside the bladder expand and the elastomeric bladder can rupture or explode. The elastomeric material itself can also be damaged because it can absorb borehole gases which will cause the material itself to rupture when it is brought back to the surface.

To alleviate the problem discussed above with respect to elastomeric material, it has been proposed in U.S. patent application Ser. No. 09/002,474, having a filing date of Jan. 2, 1998, to use a cylindrical metallic sleeve, rather than an elastomeric bladder. However, cylindrical sleeves have limited ability to expand and contract and the power that can be generated at a resonance frequency is limited accordingly.

It is an object of the invention to achieve a borehole source that does not employ an elastomeric bladder and that achieves a higher output power than a cylindrical metallic sleeve.

U.S. Pat. No. 4,671,379, which issued to Kennedy et al. on Jun. 9, 1987 and U.S. Pat. No. 4,834,210, which issued to Kennedy on May 30, 1989, disclose a system in which a pulsed energy source is deployed between two end members. Wellbore fluid occupies the space between the two end members, and the pulsed energy source excites the fluid into oscillation within the borehole space between the two end members. The distance between the two end members is varied as the frequency of the pulsed energy source is varied in order to maintain the system at resonance.

U.S. Pat. No. 5,171,943, which issued to Balogh et al. on Dec. 15, 1992, discloses a tube wave damper probe for the suppression of borehole tube waves in seismic applications. The damper comprises a gas-filled bladder within a housing. The bladder is filled with gas before the bladder is inserted into the borehole.

S. T. Chen, "A Single-Well Profiling Tool and Tube Wave Suppression" Expanded Abstract, SEG, 13–16, 1993, discusses an acoustic source comprising a stack of hollow PZT cylinders driving two end hemispherical masses.

W. T. Balogh, "The Borehole Tubewave Damper Probe" Expanded Abstracts, SEG, 159–162, 1992, describes a tube wave damper probe which utilizes a gas-filled bladder to attenuate borehole tube waves.

U.S. Pat. No. 5,137,109, which issued to Dorel on Aug. 11, 1992, discloses a downhole seismic source in which a body containing a resonant system is clamped to the borehole wall. The body contains a resonant system and excitation means for exciting the resonant system at an excitation frequency which is tuned to the resonance frequency. The source includes means for varying the resonance frequency of the resonant system in a controlled manner while actuating the excitation means. In this system the seismic signal is applied to the borehole by clamping the source to the borehole wall.

U.S. patent application Ser. No. 09/002,474, filed on January 1998 discloses a dual mode multiple-element resonant cavity piezoceramic borehole energy source utilizing the resonance frequency of the piezoceramic cavity for higher output at lower frequencies and a nonresonant mode extending across a broader frequency range at higher frequencies. The piezoceramic crystals are housed within a metallic bladder. The metallic bladder has the advantage that it is able to withstand the corrosive environment of the borehole. However, there is a need for a system that has a greater ability to transmit energy from the piezoceramic source into the borehole fluid than the metallic bladder proposed in this patent application.

SUMMARY OF THE INVENTION

The invention comprises an apparatus for generating a seismic signal in a fluid filled borehole. In one embodiment, the apparatus includes an elongated housing formed from a gas impermeable material which is substantially filled with a fluid, and a controlled frequency energy source within the housing. The housing has an external shape which is deformable in response to variations in pressure within the housing resulting from fluid resonance, thereby enabling the external volume of said housing to expand and contract in response to variations in internal pressure within said housing resulting from fluid resonance thereby increasing the magnitude of the seismic signal transmitted to the borehole fluid.

BRIEF DESCRIPTION OF THE DRAWINGS

FIG. 2 shows the deployment of the invention in a borehole seismic survey in which the seismic borehole source and seismic borehole receiver are deployed in the same borehole.

FIG. 7 shows a cylindrical sleeve for enclosing the piezoceramic actuator.

FIG. 8 shows a piezoelectric actuator comprising a plurality of piezoceramic cylinder elements.

FIG. 9 shows a mounting isolator which may be positioned at either end of the actuator shown in FIG. 8.

FIG. 10 shows a piezoceramic cylinder configuration.

FIG. 11 shows a mounting ring used to physically align and electrically isolate the piezoceramic cylinders.

FIG. 12 shows a strut which may be used to extend along the length of the piezoceramic cylinders to provide structural integrity.

FIGS. 13A, 13B and 13C show elements of the compliant end members useful for increasing power output from a borehole source.

FIG. 14 shows a connector which may be used to connect the compliant end members to the piezoceramic actuator.

FIG. 15 shows an exoskeleton which may be attached to the exterior of a borehole seismic source for structural support.

DESCRIPTION OF THE PREFERRED EMBODIMENT

Figure 1:
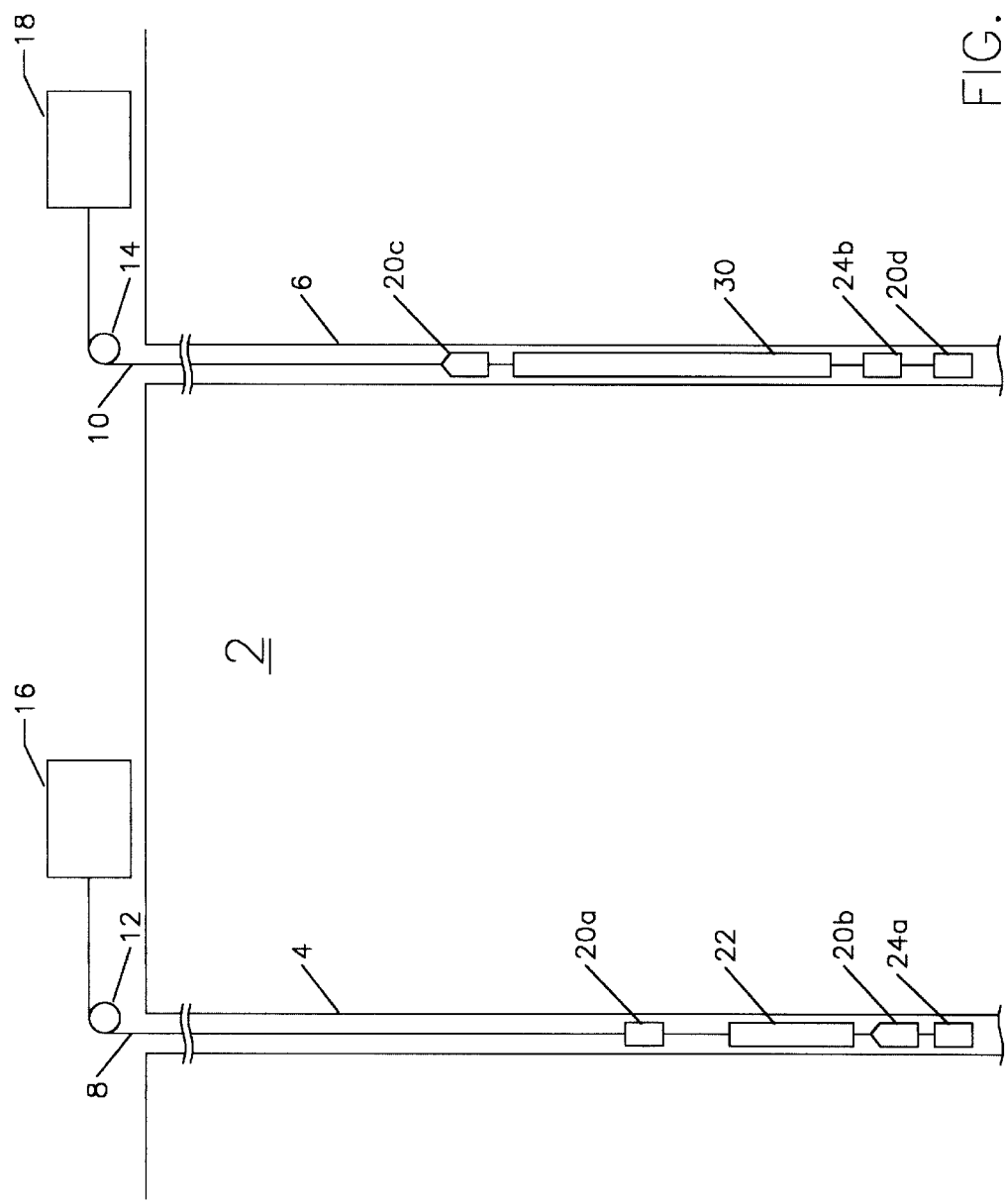
FIG. 1 shows the deployment of the invention in a borehole seismic survey in which the seismic borehole source and seismic borehole receiver are deployed in separate boreholes.

FIG. 1 shows a first implementation of the invention, in which a borehole seismic source is deployed in a first borehole 4 and a seismic receiver is deployed in a second borehole 6. Boreholes 4 and 6 penetrate a region 2 of the earth's subsurface. FIG. 2 shows a second implementation of the invention in which a borehole seismic source and a borehole seismic receiver are both deployed in the same borehole, designated as borehole 4.

Referring to FIG. 1, borehole source 22 is deployed within the borehole by means of wireline 8. Wireline 8 is lowered into the borehole 4 and retrieved from the borehole by means of winch mechanism 12, which may be of a type generally used in the industry. Tube wave deflector 20a is positioned along wireline 8 above source 22, and tube wave deflector 20b is positioned along wireline 8 below the source 22. In one particular embodiment of the invention compressed gas storage container 24a is positioned along the wireline 8 below tube wave deflector 20b. Control signals are transmitted downhole from source control instrumentation system 16 through wireline 8.

Also shown in FIG. 1 is a borehole receiver 30, which is deployed in borehole 6 by means of wireline 10. Wireline 10 is lowered into the borehole 6 and retrieved from the borehole by means of winch mechanism 14, which may be of a type generally used in the industry. Tube wave deflector 20c is deployed above borehole receiver 30 and tube wave deflector 20d is deployed below borehole receiver 30. In one particular embodiment of the invention compressed gas storage container 24b is positioned along wireline 10 above tube wave deflector 20d. Control signals are transmitted downhole from receiver control instrumentation system 18 and detected signals are transmitted from receiver 30 to the receiver control instrumentation system 18 by means of wireline 10. The receiver 30 may be hydrophones or fiber optic detectors of a type known to those of ordinary skill in the art. Alternatively, the receiver may be geophones or accelerometers, which would require the receiver to be clamped to the borehole wall in order to detect a seismic signal. Seismic signals generated by source 22 will propagate through the earth's subsurface along various ray paths and will be detected by receiver 30. Those of ordinary skill in the art will recognize that receiver 30 may comprise a receiver array, which includes a plurality of separate spaced apart receivers, in order to detect signals at a plurality of depths while the receiver is at one location in the borehole.

Referring to FIG. 2, source 22 and receiver 30 are deployed in the same borehole 4 by means of wireline 8. Tube wave deflectors 20a and 20b are positioned above and below borehole source 22, respectively, and tube wave deflectors 20c and 20d are deployed above and below receiver 30, respectively. A single compressed gas storage container 24 is used in this configuration.

Figure 3A:
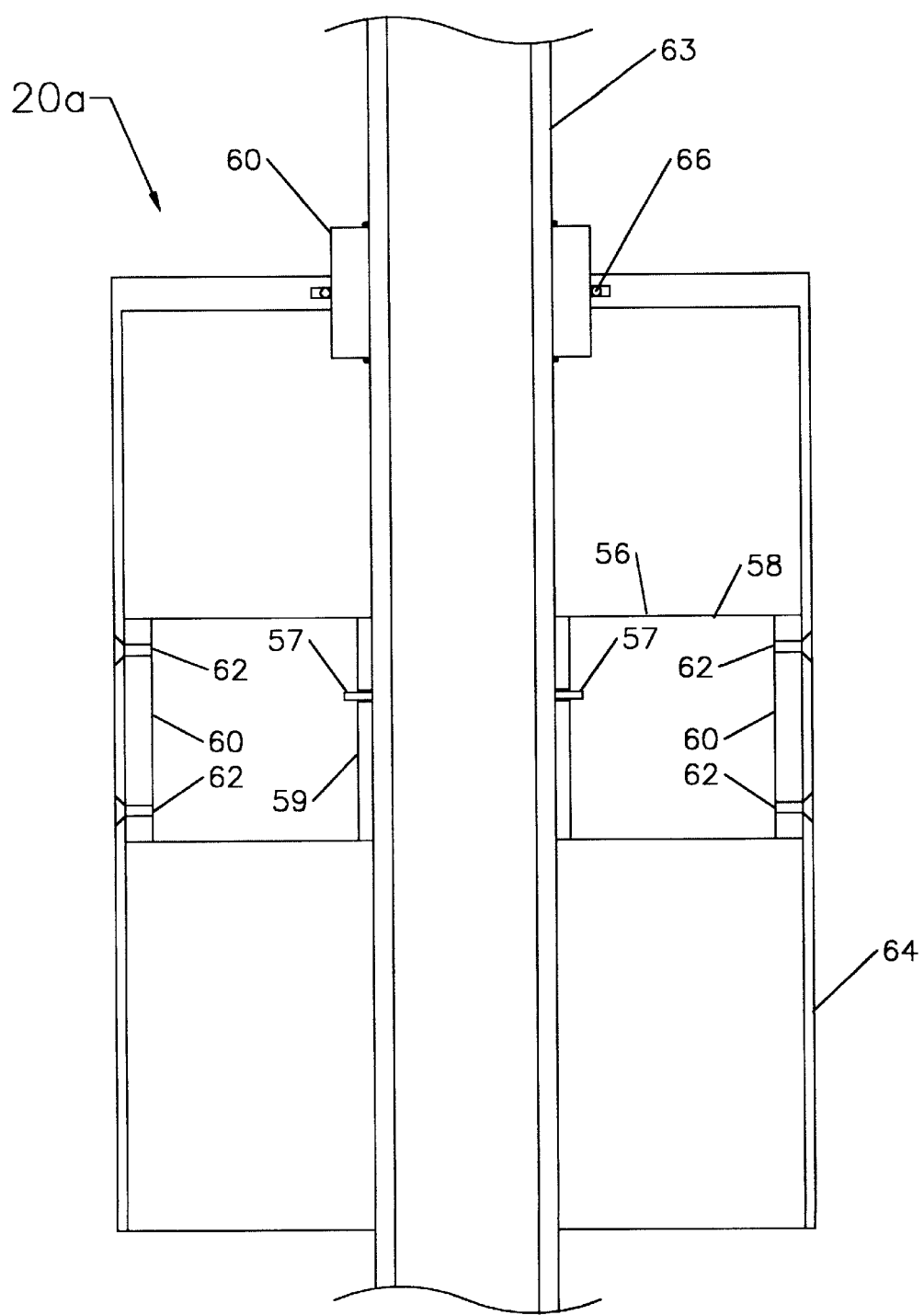
FIGS. 3A, 3B and 3C show different implementations of an apparatus for reflecting tube waves that would otherwise propagate in a borehole.

Referring again to FIG. 1, tube wave deflector 20a is positioned above source 22 to limit the upward propagation of the tube wave resulting from activation of source 22; and tube wave deflector 20b is positioned below source 22 to limit the downward propagation of tube waves. Upon reaching tube wave deflector 20a or 20b, the acoustic energy which would otherwise propagate in the borehole as a tube wave will be substantially reflected. Because the tube waves do not propagate beyond the location of the tube wave deflectors, the tube waves do not reach borehole discontinuities which would result in the generation of secondary body waves The configurations of tube wave deflectors 20a and 20b, according to a particular embodiment of the invention, are shown in FIGS. 3A and 3B.

FIG. 1 also shows tube wave deflectors 20c and 20d deployed in borehole 6, above and below receiver 30. The purpose of tube wave deflector 20c is to reflect any downwardly traveling tube wave energy upwardly so that such tube wave energy does not reach receiver 30; and the purpose of deflector 20d is to reflect downwardly any tube wave energy which is traveling upwardly, so that the region around receiver 30 is maintained substantially free of tube waves. The configurations of tube wave deflectors 20c and 20d, according to a particular embodiment of the invention, are shown in FIGS. 3B and 3C.

In one embodiment of the invention, tube wave deflectors 20a, 20b, 20c and 20d comprise a canister, open at the bottom end. The canisters may be made of a metal, such as stainless steel, or other gas impermeable materials having sufficient ruggedness to withstand borehole conditions. The canisters may be substantially cylindrical and will be at least partially filled with a gas, preferably a nonexplosive, non-oxidizing gas, such as helium or nitrogen. As described above, it is desired for tube wave energy to reflect from the bottoms of tube wave deflectors 20a and 20d and from the tops of tube wave deflectors 20b and 20c. In each instance the reflecting surface needs to have a higher acoustic compliance (lower impedance) than the wellbore fluid. The tube wave deflectors illustrated in FIGS. 3A, 3B and 3C each comprise substantially cylindrical cans which are open at the lower end and are at least partially filled with a gas. Accordingly, the borehole fluid will have a direct interface with the gas at the bottom end of the deflectors. The gas will have a higher compliance than the borehole fluid, so the necessary condition for reflectance is satisfied. The configuration for tube wave deflectors 20a and 20d do not need to reflect tube waves from their top surface. Accordingly, tube wave deflectors 20a and 20d may be constructed as shown in FIGS. 3A and 3C, with the top formed from high impedance material such as stainless steel.

Figure 3B:
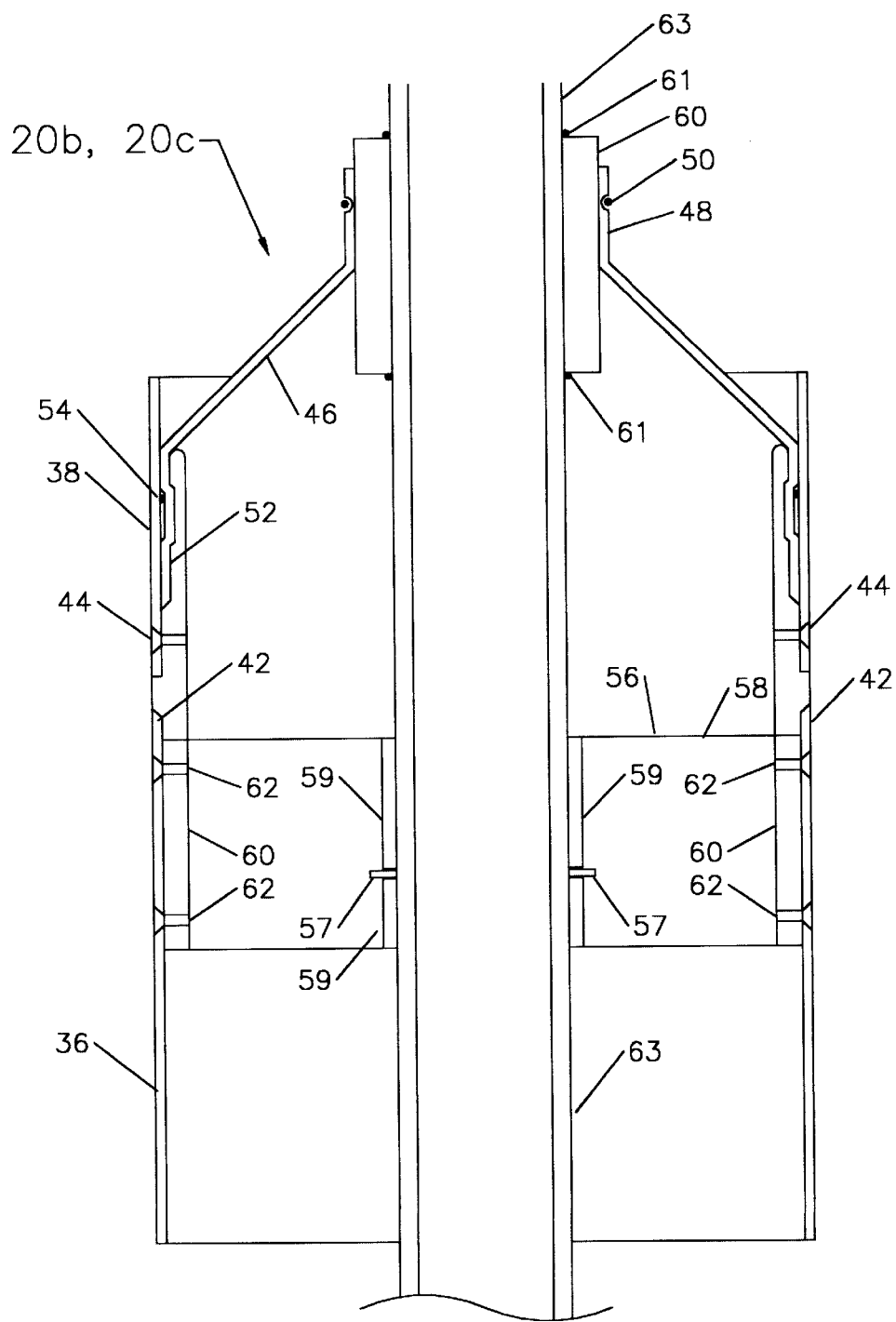
Figure 3C:
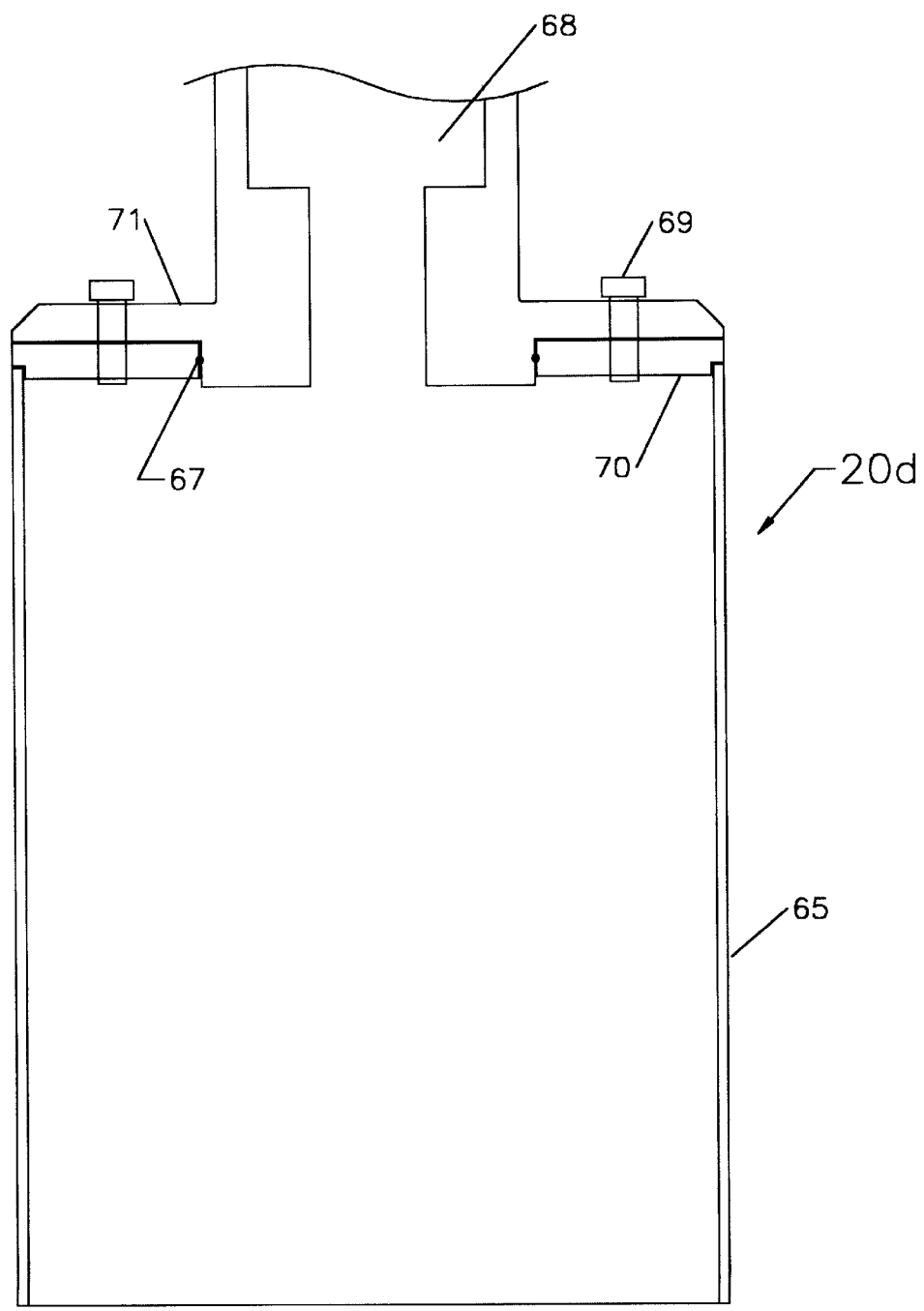

Because tube wave deflectors 20b and 20c will need to have a top surface with a greater compliance than the borehole fluid, a configuration such as shown in FIG. 3B may be utilized. Referring to FIG. 3B, tube wave deflectors 20b and 20c comprise a lower cylindrical section 36 and an upper cylindrical section 40. Upper cylindrical section 40 and lower cylindrical section 36 may be bonded together by welding along the circular connecting location designated by numeral 42. Upper ring section 38 is affixed to upper cylindrical section 40 by means of a plurality of screws 44 which may be substantially evenly spaced about the circumference of the tube wave deflectors. Only two of the screws are shown in FIG. 3B for clarity. Sealing rings (not shown) may be included under the head of each screw 44. The upper surface 46 of the tube wave deflector configuration shown in FIG. 3B comprises a compliant material, which may be a fluoroelastometer material, such as VITON™, a trademark of Dupont-Dow Elastometers, L.L.C., or other elastomeric material having a high acoustic compliance, which is preferably shaped into a conical configuration. Extending downwardly from the outer edge of upper surface 46 is a cylindrical section 52, which extends between upper ring section 38 and upper cylindrical section 40. A cord 54, which may be a nylon cord, may be wrapped around cylindrical section 52 of upper surface 46 to provide a seal to prevent the borehole fluid from entering the tube wave deflector and to prevent gases from escaping from the canister. Upper surface 46 may include a tubular section 48 within the center of the conical surface, which extends upwardly so that it can surround mounting block 60, which is secured to the tubular conduit 63 by welding at locations 61. Tubular conduit 63 is coupled to the wireline (not shown) above the tube wave deflector and extends through the axial center of the tube wave deflector to provide a conduit through the tube wave deflector for the wireline. Wrapping cord 50, which may be a nylon cord, may be wrapped around tubular section 48 to form a seal between tubular section 48 and mounting block 60, to prevent gases from escaping upwardly from the canister.

Spacer 56 maintains the canister formed by the lower cylindrical section 36, upper cylindrical section 40 and upper surface 46 substantially in axial alignment with tubular conduit 63 for structural stability. Although only one spacer 56 is shown, the tube wave deflectors may be five feet or greater in length, and it may be desirable to utilize a plurality of such spacers. In a particular embodiment of the invention, spacer 56 may comprise four vanes 58 deployed at 90 degree angles around tubular conduit 63 and extending to the inner surface of the lower cylindrical section 36. Each vane may include a flange section 60, which is secured to lower cylindrical section 36 by means of screws 62. Sealing rings (not shown) may be included under the head of each screw 62. Each vane 58 may terminate in an arcuate section 59 which is keyed to tubular conduit 63. Pins 57 are welded to tubular conduit 63, and apertures in the arcuate sections 59 fit onto the pins 57 to maintain vanes 58 in position.

Because the configurations for tube wave deflector 20a and 20d do not need to be reflective from their upper surface, the simpler tube wave deflector configuration shown in FIGS. 3A and 3C may be utilized. With reference to FIG. 3A, which shows tube wave deflector 20a in more detail, spacer 56 may be of the same configuration as for the tube wave deflector shown in FIG. 3B, and like parts are designated by the same reference designator. The canister portion 64 of tube wave deflector 20a may be formed from a unitary structure comprising a hollow cylinder, with an open bottom and closed top portion. O-rings 66 provide a seal between the upper surface of canister portion 64 and mounting block 60 to prevent borehole fluid from entering the tube wave deflector. Mounting block 60 is affixed to tubular conduit 63 by welding at locations 61. Tube wave deflector 20a is maintained in position on tubular conduit 63 by means of pins 57, as described above with reference to FIG. 3B.

FIG. 3C shows a configuration for a tube wave deflector which may be utilized for tube wave deflector 20d. Tube wave deflector 20d is deployed at the bottom of wireline 10, and for that reason, tubular conduit 63 is not required. Compressed gas is inserted into tube wave deflector 20d through conduit 68 directly from compressed gas storage container 24b. The configuration of tube wave deflector 20d comprises an open bottom cylindrical portion 65, a top cap portion 70 welded thereto, and a head member 71, which is bolted to the top cap portion by bolts 69. O-ring seal 67 is utilized to prevent borehole fluid from entering the tube wave deflector and to prevent gases from escaping.

Although use of the tube wave deflectors has been described in terms of a seismic survey in which both the seismic source and seismic receiver are deployed in a borehole, VSP (vertical seismic profiling) surveys, in which either the source or the receiver is located at the earth's surface are also within the scope of the invention.

Figure 4:
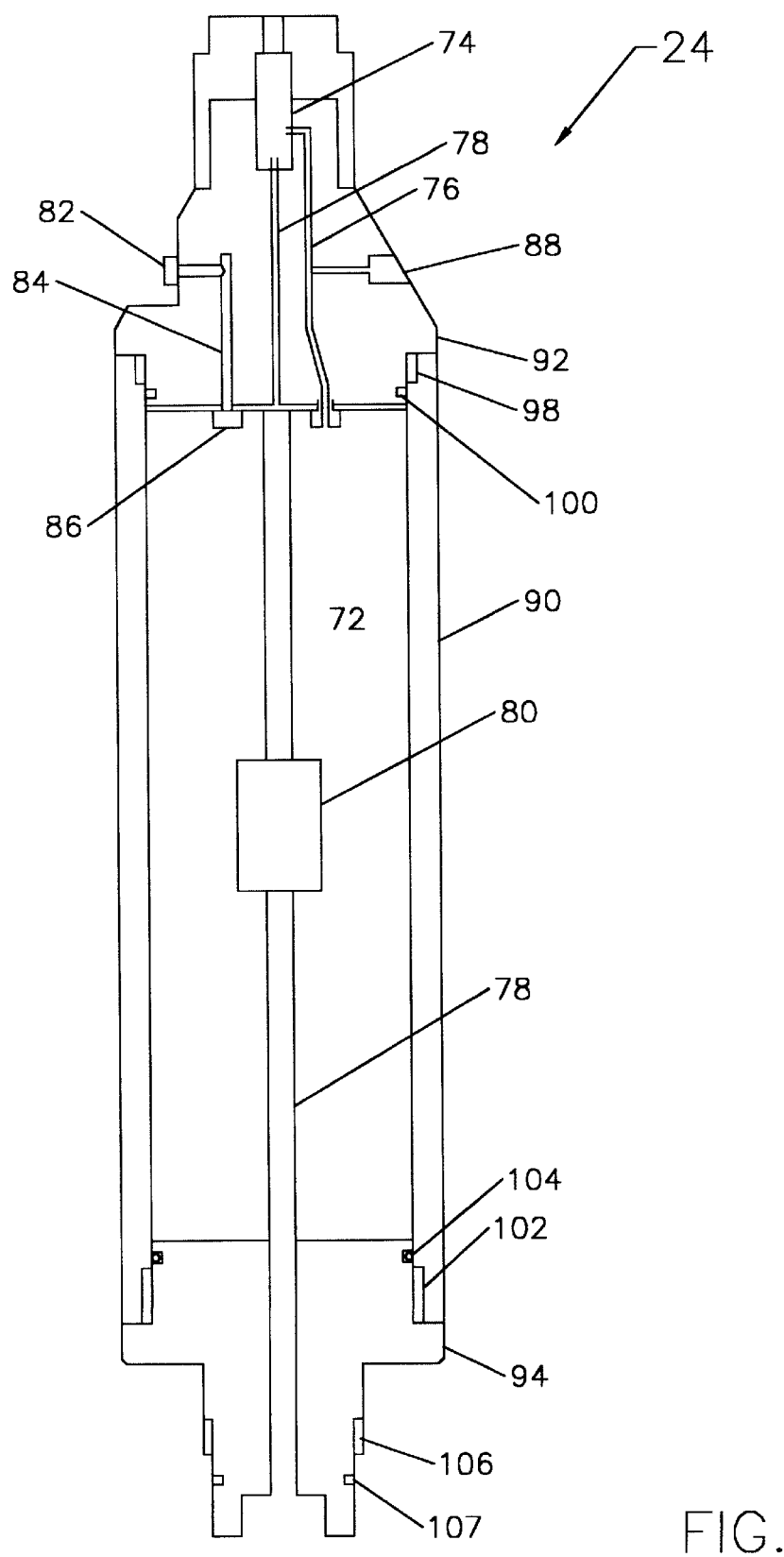
FIG. 4 shows a compressed gas storage container that may be utilized in a borehole.

FIG. 4 shows the compressed gas storage container configuration in more detail. The operation will be described in reference to FIG. 2, for convenience. Compressed gas is normally inserted into chamber 72 of compressed gas storage container 24 at the earth's surface. After the compressed gas storage container is lowered within the borehole to a selected depth, solenoid 74 is activated by means of a control signal transmitted from control instrumentation system 16 down wireline 8. Upon activation of solenoid 74, compressed gas flows from chamber 72 through conduit 76 and into conduit 78, which releases the gas into the top of tube wave deflector 20d though conduit 68. The gas passes through check valve 80, which enables gas to flow from conduit 78 into tube wave deflector 20d, but prevents any borehole fluid from flowing from the borehole into the compressed gas storage container 24.

Chamber 72 may be formed from a generally cylindrical member 90, having a hollow center, and upper head member 92 and lower head member 94. Upper head member 92 is secured to cylindrical member 90 by threaded connections 98 and O-ring seals 100. Lower head member 94 is secured to cylindrical member 90 by threaded connections 102 and O-rings seals 104.

At the surface, prior to insertion of the compressed gas storage container into the borehole, gas is injected into the chamber 72 through conduit 84. The gas flows through check valve 86. After the gas is inserted into the chamber 72, plug 82 may be inserted into the exterior opening of conduit 84 to prevent borehole fluid from entering the conduit. Valve mechanism 88 enables the gas to be removed from chamber 72 after the compressed gas storage container 24 is removed from the borehole without activating solenoid 74.

The compressed gas is normally released into the tube wave deflectors when the borehole source and/or borehole receiver is at the highest location in the borehole at which data are to be gathered. If a tube wave deflector canister is filled at a lower level, then as the source and/or receiver instrument is raised, the gas will expand and escape from the bottom of the tube wave deflectors and percolate toward the surface, thereby producing acoustic noise which might degrade the resulting data. Referring to FIG. 2, and FIGS. 3A, 3B and 3C, after solenoid 74 is activated to release gas into tube wave deflector 20d, the gas will initially displace any borehole fluid that has occupied the space within the canister of tube wave deflector 20d, and gas will then flow outwardly from the bottom of tube wave deflector 20d into the borehole and will percolate upwardly in the borehole fluid. The gas will then successively enter and fill the canisters of tube wave deflectors 20c, 20b and 20a. Conduit 68 of tube wave deflector 20d is connected to compressed gas storage container 24 by means of threaded connections 106 and O-rings which fit into O-ring grooves 107.

Referring to FIG. 1, the canisters of the tube wave deflectors are filled with gas in the same manner as described with reference to FIG. 2, except that compressed gas storage container is positioned below tube wave deflector and gas will be released through conduit 78 into the borehole fluid. The gas will percolate upwardly in the borehole fluid and successively fill the canisters of tube wave deflectors 20b and 20a.

Figure 5:
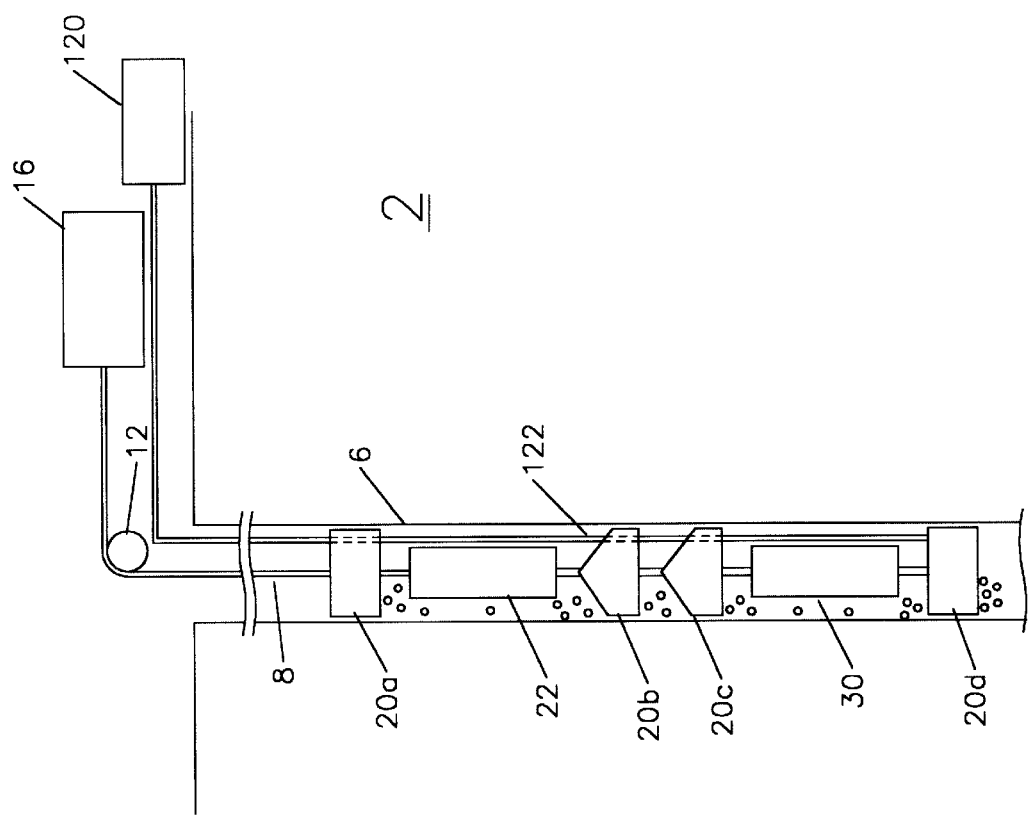
FIG. 5 shows a downhole seismic survey operation in which gas is conveyed downhole by a conduit extending from the surface.

In another embodiment of the invention, gas is supplied to the tube wave deflectors from a gas source at the earth's surface. With reference to FIG. 5, gas flows from gas source 120 on the earth's surface, down conduit 122 to the lower most tube wave deflector 20d. This embodiment is described in reference to the configuration in which the borehole source and borehole receiver are positioned in the same borehole, as in FIG. 2, although it is equally applicable to the configuration in which the borehole source and borehole receiver are deployed in separate boreholes as shown in FIG. 1. When the gas is released from conduit 122, the gas will initially fill the canister of tube wave deflector 20d. The gas will then percolate upwardly to fill successively the canister of tube wave deflectors 20c, 20b and 20a.

Figure 5A:
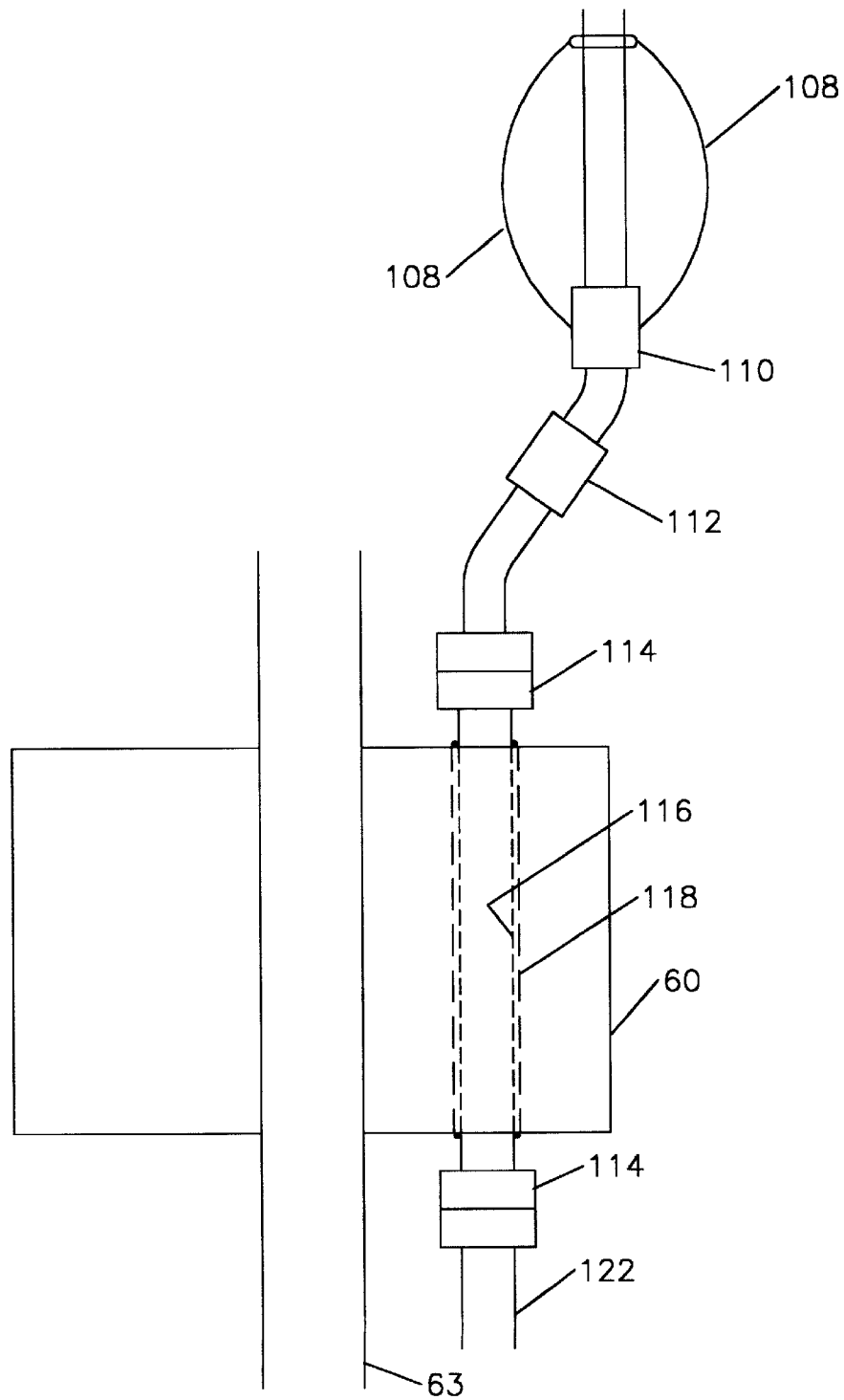
FIG. 5A shows a mechanism for detaching the conduit which carries gas from the earth's surface to the tube wave deflectors from the downhole assembly.

Because the tube wave deflectors will extend across substantially the entire diameter of the borehole, the conduit 122 may pass through the interior of tube wave deflectors 20a, 20b and 20c and release the gas directly into tube wave deflector 20d. With reference to FIG. 5A, a hole 118 is machined in mounting block 60, which surrounds tubular conduit 63, for each of tube wave deflectors 20a, 20b, 20c and 20d. A metal tube 116 is inserted through hole 118 and welded into position. Conduit 122 is connected to the metal tube by means of swivel fittings 114 on each side of mounting block 60 for tube wave deflectors 20b and 20c and on the top side of the mounting block for tube wave deflector 20a. Above tube wave deflector 20a, pressure relief and check valve 112 is included in conduit 122. When the borehole source and receiver apparatus reaches a selected borehole depth, normally the top of the zone of interest from which data will be recorded, the pressure from gas source 120 is increased, and when the pressure in conduit 122 exceeds the borehole pressure at that depth, gas will flow through pressure relief and check valve 112, and on down the conduit 122, and fill the tube wave deflector canisters as described previously.

After the borehole source/borehole receiver apparatus reaches the top of the zone of interest and the canisters of the tube wave deflectors are filled with gas, it is desirable to retract that portion of the gas carrying conduit 122 above tube wave deflector 20a in order to avoid entangling the conduit with the borehole source and receiver apparatus. Accordingly, a release mechanism, including quick release fitting 110 and lanyards 108, is utilized for that purpose. Normally, pressure is maintained in the conduit 122 above a selected level, for example 300 pounds per square inch., which is sufficient to prevent the quick release fitting from disengaging. When it is desired to release the conduit, the pressure is reduced at the surface, and a tension is applied to the lanyards which enables the quick release fitting to disengage. The portion of conduit 122 above tube wave deflector 20a is then retracted to the surface.

Only a single tube wave deflector is shown in the position of tube wave deflectors 20a, 20b, 20c and 20d. However, a plurality of such deflectors may be utilized in each position above and below the seismic source, as well as above and below the seismic receiver. Those of ordinary skill in the art will recognize also that alternative methods may be utilized for filling the tube wave deflector canisters after the tube wave deflectors are lowered into the borehole, including the producing of gas by electrical or chemical reactions with the borehole fluid.

As the tube wave deflectors are retracted to the earth's surface, the pressure around the tube wave deflectors will decrease, which will cause any gas in the canisters of the tube wave deflectors to expand. As the gas expands it will escape from the open bottom of the tube wave deflectors and percolate to the surface; thereby avoiding the danger of bladder rupture caused by expanding gases.

Figure 6:
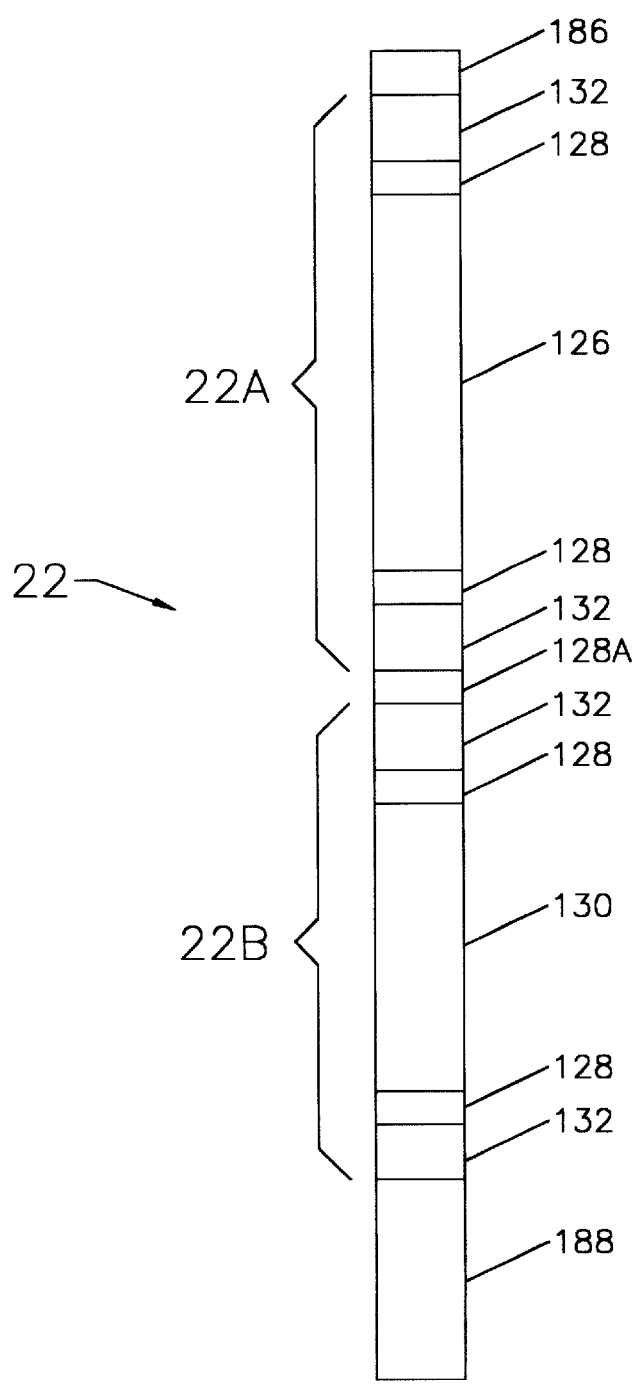
FIG. 6 shows a configuration for a borehole seismic source.

Borehole source 22 may be configured as shown in FIG. 6, which shows a source comprising source elements 22A and 22B. In a preferred embodiment, source elements 22A and 22B each comprise a piezoelectric actuator, adapted to generate a seismic signal over a selected frequency range, which might be, for example, 100 Hz. To 4000 Hz. Although a seismic signal may be generated over the entire selected frequency range, maximum power is generated at or near a resonance frequency of the actuator. In order to increase the frequency band over which a high energy level in generated, source elements 22A and 22B are adapted to achieve resonance at different frequencies within the desired frequency band. These resonance frequencies for source elements 22A and 22B may, for example, be selected as 110 Hz. and 150 Hz. Resonant frequencies are selected at lower frequencies because of the difficulty in generating sufficient power at the lower frequency range. Those of ordinary skill in the art will recognize that the resonant frequency will vary as the temperature changes.

Source element 22A comprises piezoceramic actuator 126, a connector 128 at each end thereof and a compliant end member 132 connected to each connector. Connector 128 is shown in more detail in FIG. 14 and compliant end members 132 are shown in more detail in FIGS. 13A, 13B and 13C.

Piezoceramic actuator 126 is formed from a plurality of piezoceramic cylinder elements, such as shown in FIG. 10, designated by numeral 132. Piezoceramic element 132 is formed from a cylinder of piezoceramic material, with electrically conductive bands 134 deposited thereon. Electrically conductive wires 136 and 138 are then run around the interior circumference of each piezoceramic element 132. An electrical connection is made at locations 144 by soldering or other means, between electrically conducting wire 136 and a first set of alternating conductive stripes 134, and an electrical connection is made at locations 146 between electrical conductor 138 and a second set of alternating conducting stripe 134. Each stripe in the second set of alternating stripes is positioned in intermediate positions between the stripes in the first set of conductive stripes. Electrically conducting wire 140 is then electrically connected to conducting wire 136, and electrically conducting wire 142 is electrically connected to conducting wire 138.

Each piezoceramic cylinder 132 is prestressed by winding, under tension, a high strength fiber, such as glass fiber, around the exterior circumference of the cylinder. These fibers may be translucent and are not shown on the drawing. Because the piezoceramic material is weak under tension, the piezoceramic cylinders are maintained under compression by the fiber windings, which enables the piezoceramic elements to generate higher output power without risking mechanical failure. A plurality of the piezoceramic cylinders 132 are joined end to end to form the piezoceramic actuator. In the case of actuator 126, twenty-six cylinder elements may be employed, as illustrated in FIG. 8, with each cylinder element having an outside diameter of 3.5 inches, a thickness of 0.2 inches, and a length of 2 inches. Those of ordinary skill in the art will recognize that these dimensions represent a design choice and that other dimensions could be equally as useful. For example, different outside diameters might be selected to fit borehole instruments adapted to operate in different diameter boreholes. After assembly, the piezoceramic cylinders are sprayed with a conformal coating for insulation As shown in FIG. 8, a mounting ring 150 is positioned between each piezoceramic cylinder 132. The outer portion of mounting ring 150 extends over the edges of adjacent piezoceramic cylinders 132 to align the cylinders, and a center portion of mounting rings 150 extends between adjacent piezoceramic cylinders 132 to provide electrical isolation. Electrically conducting wires 140 and 142 for each piezoceramic cylinder are routed through an aperture 167 in mounting ring 150 and are connected respectively to positive and negative electrical buses (not shown) which run the length of the assembled cylinder elements 132. Those of ordinary skill in the art will recognize that when an alternating voltage signal is applied between electrically conducting wires 140 and 142, the diameter of piezoceramic cylinders 132 will contract and expand in response to the applied electrical voltage.

FIG. 8 shows piezoceramic cylinder assembly 152 comprising the assembled piezoceramic cylinders 132, mounting rings 150 and a mounting isolator 158 at each end of the assembled piezoceramic cylinders 132. Mounting isolator 158 is shown in more detail in FIG. 9. Mounting isolators 158 include a plurality of apertures 157 to provide acoustic transparency. Cylindrical end 162 of mounting isolator 158 fits partially over the endmost piezoceramic cylinder 132. Cylindrical portion 160 of mounting isolator 158 fits into an end of a connector 128. Mounting isolators 158, which may be made of PEEK (polyetheretherketone) material, provide physical centralization, electrical isolation and acoustic transparency for the piezoceramic cylinder assembly.

In assembling piezoelectric actuator 126, a plurality of mounting struts 154, shown in FIG. 12, will extend along the length of piezoceramic cylinder assembly 152 to provide structural integrity. Mounting struts 154 include a plurality of evenly spaces holes 166. When assembled, these holes 166 will align with threaded holes 168 in mounting rings 150. Screws (not shown) are inserted in each pair of aligned holes to secure the mounting struts 154 to the mounting rings 150. The last threaded hole 166 at each end of strut 154 will be aligned with a hole 170 at end 162 of a mounting isolator 158. The assembled piezoceramic cylinders are then placed inside a sleeve 180 shown in FIG. 7. Sleeve 180 isolates the piezoceramic cylinder assembly from borehole fluids, and may be formed from a thin sheet of metal, such as stainless steel or Inconel™. (Inconel is a trademark of Inco Alloys International, Inc.)

Sleeve 180 should be sufficiently thin so that it is acoustically transparent to the signal generated by the piezoceramic cylinders. Sleeve 180 may be about the same length as piezoceramic cylinder assembly 152. A typical thickness for sleeve 180 is about 0.020 inches. The end of sleeve 180 will fit over an end 176 of a connector 128. O-rings (not shown) are inserted in O-ring grooves 178 to form a seal between sleeve 180 and connector 128.

A compliant end member 132 is attached to each end of piezoceramic actuator 126 by means of connectors 128. Connector 128 is shown in more detail in FIG. 14 and compliant end member 132 is shown in more detail in FIGS. 13A, 13B and 13C. Referring to FIG. 13A, compliant end member 132 comprises a tubular section 172, which may have a square cross-section, and which may be formed from a thin sheet of gas impermeable, flexible material, which, preferably, is resistant to corrosion from chemicals which may be present in the borehole. The material from which the square tubular section 172 is formed may be about 0.025 inches (0.0635 centimeters) thick. Tubular section 172 is preferably slightly rounded at the corners as shown in FIG. 13B. Tubular section 172 is affixed, preferably by welding, to cylindrical connecting members 174. A cylindrical member 182, which may be welded at each end to cylindrical connecting members 174 is included inside tubular section 172 for structural support. Cylindrical member 182 may be made of stainless steel or other strong metal, and includes a large number of apertures 184 so that it will be acoustically transparent. Cylindrical connecting members 174 fit over end portion 176 of connectors 128. O-rings (not shown) are inserted in O-ring grooves 178 to form a seal between the compliant end members 132 and connector 128. As shown in FIG. 14, connector 128 is hollow to allow passage of fluid therethrough. FIG. 6 shows connector 128A forming one end of source element 22A. Connector 128A may have a solid center. However, it has also been determined that the compliant end member 128 at the end of source element 22A adjacent source element 22B may also serve as a compliant end member for source element 22B, thereby eliminating the need for connector 128A and one compliant end member. Although a preferred embodiment has been described in terms of a square tubular section 172, any shape which is capable of significant expansion and contraction in response to fluctuations in internal pressure may be utilized. Useful results will be achieved if this tubular section is formed in other flat sided configurations, for example, triangular, rectangular, pentagonal and so on, although the closer the cross-section comes to being circular the less effective the configuration will be in achieving the desired result. A corrugated cross-section may also be used for tubular member 172, but such a shape may be more difficult to manufacture. Compliant end member 132 may be formed from stainless steel, Inconel, beryllium copper, or other material having similar qualities of resilience and gas impermeability, and preferably resistance to corrosion from borehole chemicals.

Figure 16:
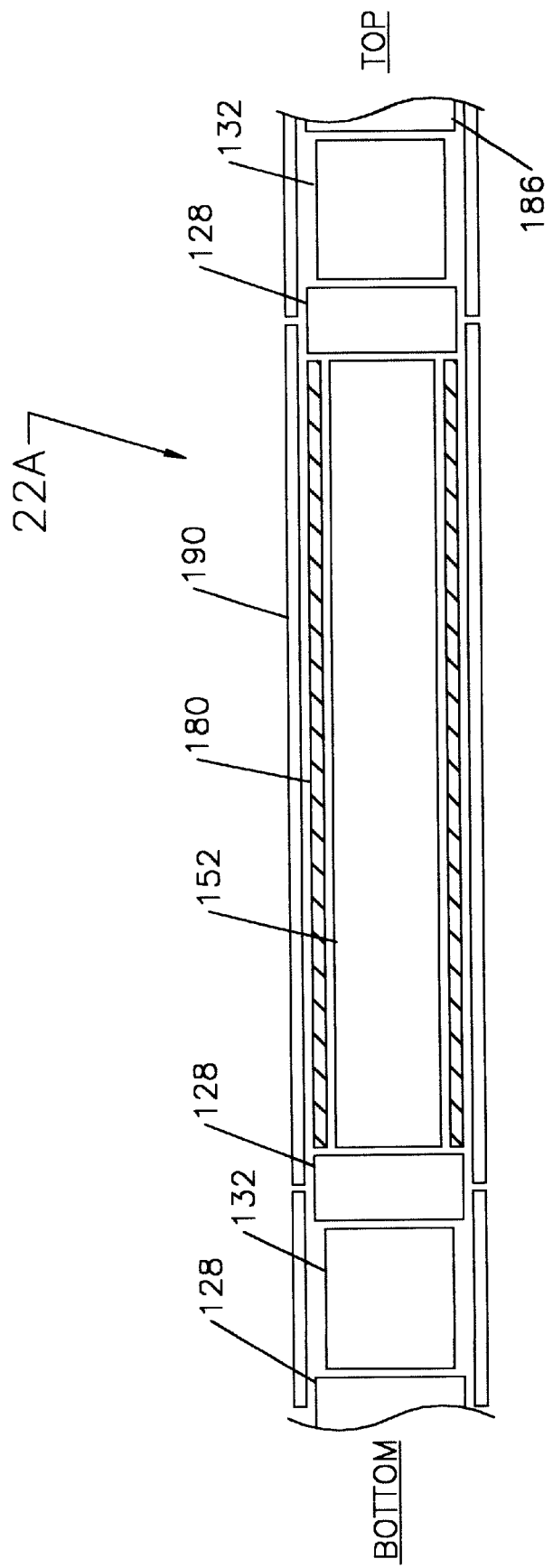
FIG. 16 is a schematic which illustrates the assembly of the seismic source.

FIG. 15 shows a section of the exoskeleton 190 which forms the external structural housing for the source 22. A large number of apertures 192 are included in the surface so that the exoskeleton will be substantially acoustically transparent to the seismic signal generated by source element 22A (and 22B). FIG. 16 is a schematic which illustrates the assembly of source element 22A. The purpose of this schematic is to aid in understanding the assembly of the seismic source, and many details of the individual elements have been omitted for clarity. FIG. 16 shows piezoceramic ring assembly 152 with a connector 128 attached to each end of piezoceramic ring assembly 152. Sleeve 180 surrounds the piezoceramic ring assembly 152 in the lateral direction. A compliant end member 132 is attached to each end of piezoceramic ring assembly 152 by a connector 128. Another connector 128 is attached to the other end of the compliant end member which is on the end of source element 22A designated as "bottom", and top sub 186 is attached to the other end of the compliant end member which is on the end of the source element 22A designated as "top". Exoskeleton 190 is shown forming the outer surface of seismic source element 22A. Referring to FIGS. 14 and 15, the holes 194 in exoskeleton 190 will align with holes 196 in connector 128 and screws (not shown) are inserted through these holes in the assembly of the source element. The construction of source element 22B is analogous to the assembly of source element 22A and will not be discussed in detail.

Source element 22A is activated by applying an electrical signal, which may be a swept sine wave, across the electrical bus to which electrical conductor 140 is connected and the electrical bus to which electrical conductor 142 is connected. Application of this electrical signal will cause piezoceramic cylinders 132 to expand and contract in response to the magnitude and phase of the applied electrical signal, thereby projecting an acoustic signal into the earth's subsurface surrounding the borehole. In one particular embodiment, the applied electrical signal may be swept over a frequency range extending from 100 Hz. to 4000 Hz. Sleeve 180 and the two compliant end members 132 on each side of sleeve 180 form a cavity which is filled with fluid, which may be a perfluorinated liquid, such as Fluorinert™ fluid, from the 3M Company. Those of ordinary skill in the art will recognize that the magnitude of energy projected by source element 22 will be enhanced at the resonance frequency of the fluid filled cavity formed by sleeve 180 and the two compliant end members 132. Those of ordinary skill in the art are aware that the resonant frequency of an elongated fluid filled cavity for half wave resonance is:

$$f = c/2L.$$

where f=frequency; c is the acoustic velocity of the fluid in the cavity; and L is the length of the cavity. In one embodiment of the invention, the length of the cavity may be selected to achieve a nominal resonance frequency of 110 Hz., in order to increase the magnitude of the generated signal at the lower end of the frequency sweep. The internal volume of the compliant end members, which may be formed from a thin sheet of resilient metal and have a square cross-section, is capable of expanding and contracting in response to variations in internal pressure to a much greater extent than a cylinder is capable of, thereby projecting greater energy into the earth's subsurface.

Borehole source element 22B is formed and operated in the same manner as borehole source element 22A, except that if the resonance frequency is selected to be 150 Hz., its length will be shorter than that of source element 22A, whose resonance frequency was selected to be 110 Hz. Also shown in FIG. 6 is pressure compensator 188, which serves to equalize the pressure inside source 22 with the pressure in the borehole. Pressure equalizer 188 might comprise, for example, a cylinder and piston, with the piston blocking fluid flow into and out of the source 22, but movable inside the cylinder in response to pressure on either side of the piston to maintain the pressure inside the borehole source at the same level as the pressure in the borehole. Such pressure equalizers are well known to those of ordinary skill in the art and will not be discussed in detail. At the opposite end of the borehole source from the pressure equalizer 188 is top sub 186, which is a standard adapter tool which allows a standard wireline conductor to enter the borehole source. Top sub 186 also includes a fluid conduit to allow fluid to be inserted into the center of source elements 22A and 22B.

The invention has been described with a certain degree of particularity, however, many changes may be made in the details without departing from the scope of the invention. It is understood that the invention is not limited to the embodiments set forth herein, but is to be limited only to the scope of the attached claims, including the full range of equivalency to which each element thereof is entitled.

I claim:

1. An apparatus for generating a seismic signal in a fluid filled borehole comprising:

an elongated housing formed from a gas impermeable material, said housing being substantially filled with a fluid; and a controlled frequency energy source within said housing;

wherein said housing has an external shape which is deformable in response to variations in pressure resulting from fluid resonance within said housing induced by said controlled frequency energy source, thereby enabling the external volume of said housing to expand and contract in response to variations in internal pressure within said housing resulting from fluid resonance to enhance the transmission of said seismic signal to the borehole fluid.

2. An apparatus for generating a seismic signal in a fluid filled borehole comprising:

an elongated housing formed from a gas impermeable material comprising a cylindrical center portion and compliant end members connected to each end of said cylindrical center portion;

a controlled frequency energy source comprising an assembly of axially aligned piezoceramic cylinders within said housing;

wherein said compliant end members have a non-cylindrical external shape which allows a greater variation in the external volume of said housing in response to variations in pressure within said housing than a cylindrical shape would permit.

3. The apparatus of claim 2 wherein said compliant end members have a tubular shape with a flat-sided cross-section.

4. The apparatus of claim 3 where said cross-section is substantially square.

5. The apparatus of claim 2 wherein said compliant end members are formed from a metallic material.

6. The apparatus of claim 5 wherein said metallic material is stainless steel.

7. The apparatus of claim 5 wherein said metallic material is Inconel.

8. The apparatus of claim 5 wherein said metallic material in beryllium copper.

9. The apparatus of claim 2 wherein the shape of said compliant end member is tubular with a corrugated cross-section.

10. An apparatus for generating an acoustic signal at at least a selected frequency in response to an input control signal comprising:
- a plurality of cylindrical piezoceramic elements which are aligned to form a cylindrical piezoelectric actuator;
- an elongated housing which substantially surrounds said cylindrical piezoelectric actuator; said elongated housing further comprising:
- a cylindrical sleeve formed from gas impermeable material which is external to and substantially axially aligned with said piezoelectric actuator;
- two compliant end members formed from a gas impermeable, resilient material, one end member being connected to each end of said cylindrical sleeve and extending to each side of said cylindrical piezoelectric actuator, said end members having a deformable shape which allows the external volume of said elongated housing to expand and contract in response to a variations in pressure within said housing resulting from actuation of said piezoelectric actuator.

11. The apparatus of claim 10 wherein at least a portion of said compliant end members have a tubular shape with a flat-sided cross-section.

12. The apparatus of claim 11 where said cross-section is substantially square.

13. The apparatus of claim 10 wherein said compliant end members are formed from a metallic material.

14. The apparatus of claim 13 wherein said metallic material is stainless steel.

15. The apparatus of claim 13 wherein said metallic material is Inconel.

16. The apparatus of claim 13 wherein said metallic material is beryllium copper.

17. The apparatus of claim 10 wherein the shape of said compliant end member is tubular with a corrugated cross-section.

18. An apparatus for generating a swept frequency seismic signal in a fluid filled borehole comprising:
- a first controlled-frequency energy source,
- a first elongated metallic sleeve which substantially surrounds said first controlled-frequency energy source, said metallic sleeve being formed from a thin layer of metal so that said sleeve is substantially acoustically transparent to signals emanating from said first controlled-frequency energy source;
- a second controlled-frequency energy source;
- a second elongated metallic sleeve which substantially surrounds said second controlled-frequency energy source, said metallic sleeve being formed from thin layer of metal so that said sleeve is substantially acoustically transparent to signals emanating from said second controlled-frequency energy source;
- metallic compliant end members connected in fluid communication to each end of said first and said second elongated housing;
- wherein said first elongated metallic sleeve and the two metallic end members connected thereto form a first resonant cavity, and said second elongated metallic sleeve and the two end members connected thereto form a second resonant cavity; the first said resonant cavity having a different resonant frequency from the resonant frequency of the second said resonant cavity.

19. The apparatus of claim 17 wherein said compliant end members are tubular is shape and have a flat-sided cross-section.

20. The apparatus of claim 18 wherein said cross-section is substantially square.

21. The apparatus of claim 19 wherein the corners of said substantially square cross-section are rounded.

22. The apparatus of claim 17 wherein said compliant end members are tubular is shape and have a corrugated cross-section.

23. An apparatus for generating a seismic signal in a fluid filled borehole comprising:
- an elongated piezoceramic actuator formed from a plurality of aligned piezoceramic cylinder elements;
- a housing around said actuator, said housing comprising a cylindrical sleeve, axially aligned with and enclosing said piezoelectric actuator in the lateral direction and two compliant end members connected to each end of said cylindrical sleeve, said compliant end members formed from a flexible, gas impermeable material capable of expanding and contracting in response to variations in pressure within said housing;
- a fluid which substantially fills said housing;
- wherein said actuator generates a swept frequency sine wave signal across a selected frequency range in response to an input control signal and the length of said housing is selected so that the fluid within said housing goes into resonance at a selected frequency within said frequency range and said compliant end members have a shape that permits the volume of said compliant end members to expand and contract in response to pressure variations within said housing resulting from resonance in said fluid.

24. The apparatus of claim 23 wherein said compliant end members have a tubular shape with a flat-sided cross-section.

25. The apparatus of claim 24 where said cross-section is substantially square.

26. The apparatus of claim 23 wherein said compliant end members are formed from a metallic material.

27. The apparatus of claim 26 wherein said metallic material is stainless steel.

28. The apparatus of claim 26 wherein said metallic material is Inconel.

* * * * *